Patented Oct. 27, 1931

1,829,646

UNITED STATES PATENT OFFICE

HANS GUBLER AND GUILLAUME DE MONTMOLLIN, OF BASEL, AND JOSEPH SPIELER, OF LAUFEN, SWITZERLAND, ASSIGNORS TO THE FIRM SOCIETY OF CHEMICAL INDUSTRY IN BASLE, OF BASEL, SWITZERLAND

METALLIFEROUS AZO-DYESTUFFS AND PROCESS OF MAKING SAME

No Drawing. Application filed November 30, 1929, Serial No. 410,863, and in Switzerland December 11, 1928.

This invention relates to the manufacture of new metalliferous azo-dystuffs suitable for dyeing various fibers, but particularly vegetable fibers and artificial fibers consisting of so-called regenerated cellulose. It comprises the process of making these dyestuffs, the dyestuffs themselves, and the material dyed with these new dyestuffs.

The invention consists in producing complex metal compounds of azo-dyestuffs of the general formula $$(R_1-N=N-R_2-N=N-)_x R_3$$

in which $R_1$ is the residue of the diazotizing component consisting of the sulfonated nucleus of the benzene or naphthalene series, $R_2$ is an unsulfonated nucleus of the benzene series which contains in ortho-position to the second azo-group an OH-group, one of these two substituents being in para-position to the first azo-group, $R_3$ is the residue of a coupling component which can couple once or several times, and $x$ is a whole number which is not higher than the number of the positions capable of coupling in the residue $R_3$.

These products are valuable dyestuffs capable of dyeing vegetable fibers or artificial fibers belonging to the group of regenerated cellulose, such as viscose or cupramonia, silk, or animal fibers, such as wool, leather, natural silk or loaded silk, violet, blue, green and grey tints which have very good properties of fastness, particularly very good to excellent fastness to light. They form dark powders which dissolve in water to solutions having the above mentioned colors.

These metalliferous dyestuffs are made by treating the parent azo-dyestuff with an agent yielding metal capable of forming complexes, or a mixture of such agents, such as salts of copper, chromium, nickel, iron, cobalt, titanium, aluminum, etc., or the corresponding oxides, hydroxides or salts, which these compounds form with alkalies or bases.

The new metalliferous dyestuffs may also be made together with production of the corresponding azo-dyestuffs in a single operation by treating a diazo-compound of the general formula $$R_1-N=N-R_2-N=N-OH,$$

in which $R_1$ and $R_2$ have the aforesaid signification, with the coupling component designated above as $R_3$, in presence of a metal yielding agent referred to above.

Those dyestuffs of this group which have affinity for cotton can also be made in the dyebath or on the fiber by treating the corresponding azo-dyestuff in the dye-bath or on the fiber (cotton or artificial silk from so-called regenerated cellulose) with the agent yielding metal. Among these dyestuffs are particularly important those in which $R_3$ is the residue of a so-called cotton component, such as 2-amino-5-hydroxynaphthalene-7-sulfonic acid, 2-amino-8-hydroxynaphthalene-6-sulfonic acid, an N-acidyl-, N-alkyl- or N-aryl-derivative of such an acid, including obviously the corresponding urea-, thiourea- and dinaphthyl-derivatives; also triazine-, quinazoline-, pyridazine- and pyrimidine-derivatives of the said amino-naphthols or other amino-naphthols, such as, among others, 1:8-amino-naphthols, and, quite generally, those dyestuffs in which $x$ is a whole number greater than 1.

The following examples illustrate the invention, the parts being by weight:—

Example 1

A disazo-dyestuff is prepared by diazotizing 30.3 parts of 2-aminonaphthalene-4:8-disulfonic acid, coupling with aminocresol ($CH_3:OH:NH_2=1:4:3$) and further diazotizing and coupling with 2-phenylamino-5-hydroxynaphthalene-7-sulfonic acid. The azo-dyestuff thus obtained of the formula

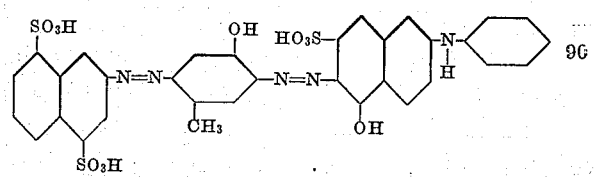

is dissolved in 500 parts of water. The solution is heated to 50° C. and mixed with an ammoniacal solution of 25 parts of crystallized copper sulfate. The temperature is maintained for 1 hour at 50° C. and the copper compound which has been produced is isolated by salting out and filtering. It dyes cotton blue tints. The blue tints produced on so-called stripey viscose silk are very equal and very fast to light. Natural silk is also dyed blue tints fast to light.

*Example 2*

56 parts of the sodium salt of the tetrakis-azo-dyestuff of the formula

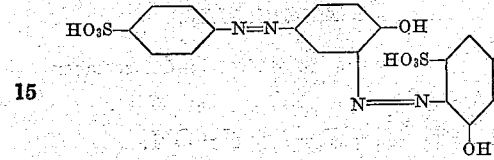

made by coupling diazotized sulfanilic acid with 2-acetylamino-1-hydroxybenzene, saponifying, further diazotizing and coupling with 5:5'-dihydroxy-2:2'-dinaphthylurea-7:7'-disulfonic acid, are dissolved in 2000 parts of water at 75° C. and the solution is acidified with acetic acid. 30 parts of crystallized copper sulfate, in the form of a solution of 20 per cent. strength, are added and the whole is stirred for 2 hours at 75–95° C. The separated copper salt is filtered, dissolved in an excess of ammonia solution of 3 per cent. strength at 60° C. and then the ammonium salt of the copper complex is separated and isolated by precipitation by means of common salt. It dyes cotton directly brownish, red-violet tints of excellent fastness to light.

The following table shows the constitution of and tints produced by some dyestuffs made by this invention:—

| | Initial component (contains the residue $R_1$) | Middle component (contains the residue $R_2$) | End component (contains the residue $R_3$) | Tint of a metal compound on the fiber |
|---|---|---|---|---|
| I. | Sulfanilic acid | Aminocresol $CH_3:OH:NH_2=1:4:3$ | 2-phenylamino-5-hydroxynaphthalene-7-sulfonic acid | Cu-compound greenish blue (cotton or viscose silk) |
| II. | Metanilic acid | Aminocresol $CH_3:OH:NH_2=1:4:3$ | 2-phenylamino-5-hydroxynaphthalene-7-sulfonic acid | Cu-compound blue (cotton or viscose silk) |
| III. | Metanilic acid | Aminocresol $CH_3:OH:NH_2=1:4:3$ | 2-phenylamino-8-hydroxynaphthalene-6-sulfonic acid | Cu-compound dark grey (cotton or viscose silk) |
| IV. | Metanilic acid | Aminocresol $CH_3:OH:NH_2=1:4:3$ | 1:8-amino-hydroxynaphthalene-3:6-disulfonic acid | Cu-compound green-blue (cotton or viscose silk) |
| V. | 2-naphthyl-amine-4:8-disulfonic acid | Aminocresol $CH_3:OH:NH_2=1:4:3$ | 2-phenylamino-5-hydroxynaphthalene-7-sulfonic acid | Cu-compound blue (cotton or viscose silk) |
| VI. | 2-naphthyl-amine-4:8-disulfonic acid | Aminocresol $CH_3:OH:NH_2=1:4:3$ | 2-phenylamino-5-hydroxynaphthalene-7-sulfonic acid | Cr-compound blue-green (cotton or viscose silk) |
| VII. | 2-naphthyl-amine-4:8-disulfonic acid | Aminocresol $CH_3:OH:NH_2=1:4:3$ | 1:8-amino-hydroxynaphthalene-4-sulfonic acid | Cu-compound green (cotton or viscose silk) |
| VIII. | 2-naphthyl-amine-4:8-disulfonic acid | Aminocresol $CH_3:OH:NH_2=1:4:3$ | 1:8-amino-hydroxynaphthalene-3:6-disulfonic acid | Cu-compound green (cotton or viscose silk) |
| IX. | Sulfanilic acid | Ortho-amino-phenol | Urea of 2-amino-5-hydroxy-naphthalene-7-sulfonic acid | Cu-compound brownish red (cotton or viscose silk) |
| X. | Sulfanilic acid | Ortho-amino-phenol | 2:2'-dinaphthylamine-5:5'-dihydroxy-7:7'-disulfonic acid | Cu-compound intense red blue (cotton or viscose silk) |
| XI. | Sulfanilic acid | Ortho-amino-phenol | 2-phenylamino-5-hydroxynaphthalene-7-sulfonic acid | Cu-compound red blue (cotton or viscose silk) |
| XII. | Sulfanilic acid | Aminocresol $CH_3:OH:NH_2=1:4:3$ | 3-methyl-5-pyrazolone | Cr-compound violet (on wool) |
| XIII. | Sulfanilic acid | Aminocresol $CH_3:OH:NH_2=1:4:3$ | Barbituric acid | Cr-compound violet (on wool) |

The formula of the dyestuff IV is:—

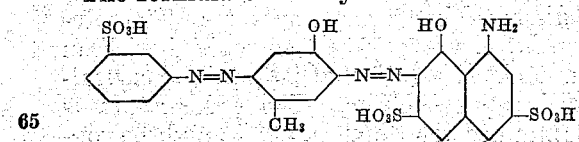

The formula of dyestuff XIII is:—

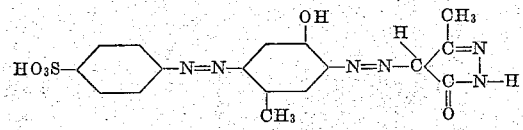

What we claim is:—

1. A manufacture of metalliferous azo-dyestuffs suitable for dyeing vegetable fibers, artificial fibers and animal fibers, by treating with agents yielding metals capable of forming complexes the azo-dyestuffs of the general formula $$(R_1-N=N-R_2-N=N-)_x R_3$$

in which $R_1$ is the residue of a diazotizing component consisting of a sulfonated nucleus of the benzene or naphthalene series; $R_2$ is an unsulfonated nucleus of the benzene series which contains in ortho-position to the second azo-group an OH-group, one of these two substituents being in para-position to the first azo-group, $R_3$ is the residue of a coupling component which can couple once up to three times, and $x$ is a whole number which is not higher than three.

2. A manufacture of metalliferous azo-dyestuffs suitable for dyeing vegetable fibers, artificial fibers and animal fibers, by treating with a group of agents yielding metals, consisting of agents yielding copper and chromium, an azo-dyestuff of the general formula $$(R_1-N=N-R_2-N=N-)_x R_3$$

in which $R_1$ is the residue of a diazotizing component consisting of a sulfonated nucleus of the benzene or naphthalene series, $R_2$ is an unsulfonated nucleus of the benzene series which contains in ortho-position to the second azo-group an OH-group, one of these two substituents being in para-position to the first azo-group, $R_3$ is the residue of a coupling component which can couple once up to three times, and $x$ is a whole number which is not higher than two.

3. A manufacture of cupriferous azo-dyestuffs for dyeing vegetable fibers, artificial fibers and animal fibers, by treating with agents yielding copper an azo-dyestuff of the general formula

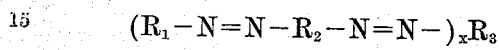

in which $R_1$ is the residue of a diazotizing component consisting of a sulfonated nucleus of the benzene or naphthalene series, $R_2$ is an unsulfonated nucleus of the benzene series which contains in ortho-position to the second azo-group an OH-group, one of these two substituents being in para-position to the first azo-group, $R_3$ is the residue of a coupling component which can couple once up to three times, and $x$ is a whole number which is not higher than two.

4. A manufacture of cupriferous azo-dyestuffs for dyeing vegetable fibers, artificial fibers and animal fibers, by treating with agents yielding copper an azo-dyestuff of the general formula

in which $R_1$ is a sulfonated nucleus of the benzene or naphthalene series, $R_2$ is an unsulfonated nucleus of the benzene series which contains in ortho-position to the second azo-group an OH-group, one of these two substituents being in para-position to the first azo-group, and $R_3$ is the residue of a coupling component which can couple once or twice.

5. A manufacture of blue to blue-green dyeing cupriferous azo-dyestuffs for vegetable fibers, artificial fibers and animal fibers, by treating with agents yielding copper an azo-dyestuff of the formula

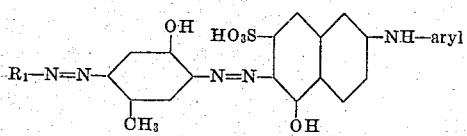

in which $R_1$ is a sulfonated nucleus of the benzene or naphthalene series.

6. The process of claim 4 for the production of cupriferous azo-dyestuffs suitable for the dyeing of vegetable, artificial and animal fibers, consisting in coupling, in presence of agents yielding copper, and in an alkaline medium, the diazo-compounds of the general formula

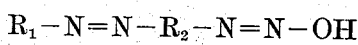

in which $R_1$ is the residue of a diazotizing component consisting of a sulfonated nucleus of the benzene or naphthalene series, and $R^2$ is an unsulfonated nucleus of the benzene series which contains in ortho-position to the diazo-group an OH-group, one of these two substituents being in para-position to the azo-group, with compounds of the general formula

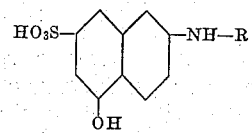

in which R means H, aryl or acidyl.

7. As new products of manufacture the complex metal compounds of azo-dyestuffs of the general formula

in which $R_1$ is the residue of a diazotizing component consisting of a sulfonated nucleus of the benzene or naphthalene series, $R_2$ is an unsulfonated nucleus of the benzene series which contains in ortho-position to the second azo-group an OH-group, one of these two substituents being in para-position to the first azo-group, $R_3$ is the residue of a coupling component which can couple once up to three times, and $x$ is a whole number which is not higher than three, which products, forming dark powders, are valuable dyestuffs capable of dyeing vegetable fibers and artificial fibers belonging to the group of regenerated cellulose, and animal fibers violet, blue, green and grey tints, which are fast to light, and dissolving in water to solutions of similar coloration.

8. As new products of manufacture the complex metal compounds deriving from a group of metals consisting of copper and chromium and from the azo-dyestuffs of the general formula

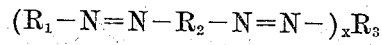

in which $R_1$ is the residue of a diazotizing component consisting of a sulfonated nucleus of the benzene or naphthalene series, $R_2$ is an unsulfonated nucleus of the benzene series which contains in ortho-position to the second azo-group an OH-group, one of these two substituents being in para-position to the first azo-group, $R_3$ is the residue of a coupling component which can couple once up to three times, and $x$ is a whole number which is not higher than three, which products, forming dark powders, are valuable dyestuffs capable of dyeing vegetable fibers and artificial fibers belonging to the group of regenerated cellulose, and animal fibers violet, blue, green and grey tints, which are fast to light, and dissolving in water to solutions of similar coloration.

9. As new products of manufacture the complex copper compounds of the azo-dyestuffs of the general formula

in which $R_1$ is the residue of a diazotizing component consisting of a sulfonated nucleus of the benzene or naphthalene series, $R_2$ is an unsulfonated nucleus of the benzene series which contains in ortho-position to the second azo-group an OH-group, one of these two substituents being in para-position to the first azo-group, $R_3$ is the residue of a coupling component which can couple once or twice, and $x$ is a whole number which is not higher than two, which products are valuable dyestuffs capable of dyeing vegetable fibers and artificial fibers belonging to the group of regenerated cellulose, and animal fibers, violet, blue, green-blue and grey tints which are fast to light, and dissolving in water to solutions of similar colorations.

10. As new products of manufacture the complex copper compounds of the azo-dyestuffs of the general formula

in which $R_1$ is a sulfonated nucleus of the benzene or naphthalene series, $R_2$ is an unsulfonated nucleus of the benzene series which contains in ortho-position to the second azo-group an OH-group, one of these two substituents being in para-position to the first azo-group, and $R_3$ is the residue of a coupling component which can couple once or twice, which products are valuable dyestuffs capable of dyeing vegetable fibers and artificial fibers belonging to the group of regenerated cellulose, and animal fibers, violet, blue, green-blue and grey tints which are fast to light, and dissolving in water to solutions of similar colorations.

11. As new products of manufacture the complex copper compounds of the azo-dyestuffs of the general formula

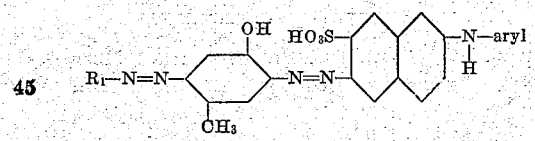

in which $R_1$ is a sulfonated nucleus of the benzene or naphthalene series, which products are valuable dyestuffs capable of dyeing vegetable fibers and artificial fibers belonging to the group of regenerated cellulose, and animal fibers, blue and green-blue tints which are fast to light, and dissolving in water to solutions of similar colorations.

In witness whereof we have hereunto signed our names this 18th day of November 1929.

HANS GUBLER.
GUILLAUME DE MONTMOLLIN.
JOSEPH SPIELER.